United States Patent
Ardes

(10) Patent No.: US 10,576,401 B2
(45) Date of Patent: Mar. 3, 2020

(54) FLUID FILTER WITH A VALVE UNIT

(71) Applicant: Hengst SE, Muenster (DE)

(72) Inventor: Wilhelm Ardes, Ascheberg (DE)

(73) Assignee: HENGST SE, Muenster (DE)

(*) Notice: Subject to any disclaimer, the term of this patent is extended or adjusted under 35 U.S.C. 154(b) by 101 days.

(21) Appl. No.: 15/755,864

(22) PCT Filed: Aug. 23, 2016

(86) PCT No.: PCT/EP2016/069898
§ 371 (c)(1),
(2) Date: Feb. 27, 2018

(87) PCT Pub. No.: WO2017/036857
PCT Pub. Date: Mar. 9, 2017

(65) Prior Publication Data
US 2019/0030469 A1    Jan. 31, 2019

(30) Foreign Application Priority Data

Aug. 28, 2015   (DE) .................. 10 2015 114 323

(51) Int. Cl.
*B01D 35/147* (2006.01)
*B01D 29/15* (2006.01)
*B01D 35/153* (2006.01)

(52) U.S. Cl.
CPC .......... *B01D 35/147* (2013.01); *B01D 29/15* (2013.01); *B01D 35/153* (2013.01);
(Continued)

(58) Field of Classification Search
CPC .............. B01D 35/147; B01D 35/153; B01D 2201/316; B01D 27/10; B01D 27/103; B01D 27/106
See application file for complete search history.

(56) References Cited

U.S. PATENT DOCUMENTS 2,995,249 A * 8/1961 Boewe ................. B01D 27/08
  210/130
3,132,097 A   5/1964 Tietz
(Continued)

FOREIGN PATENT DOCUMENTS

DE      20004431      6/2000
DE    102013223352    5/2015
WO     2015036107     3/2015

OTHER PUBLICATIONS

International Search Report, dated Nov. 24, 2016, priority document.

*Primary Examiner* — Benjamin M Kurtz
(74) *Attorney, Agent, or Firm* — Greer, Burns & Crain, Ltd.

(57) ABSTRACT

A fluid filter with a housing, a fluid inlet, a fluid outlet, a central standpipe which forms the fluid outlet, a filter insert which is plugged onto the standpipe, and a valve unit which is arranged on the outer circumference of the standpipe. The valve unit has a valve seat, a valve body which can be moved in the axial direction of the standpipe, a valve spring which is guided on the standpipe and biases the valve body in the valve closing direction, and a valve spring support which is attached to the standpipe. The valve body is made of an elastomer body, and an intermediate valve ring which is guided on the standpipe in an axially movable manner, is arranged between the valve spring and the valve body.

13 Claims, 3 Drawing Sheets

(52) U.S. Cl.
CPC ............... *B01D 2201/0415* (2013.01); *B01D 2201/0461* (2013.01); *B01D 2201/291* (2013.01); *B01D 2201/316* (2013.01)

(56) References Cited

U.S. PATENT DOCUMENTS

| | | | | |
|---|---|---|---|---|
| 3,887,467 A | * | 6/1975 | Johnson | ................ B01D 29/11 210/186 |
| 5,256,280 A | * | 10/1993 | Anderly | ................ B01D 27/06 210/130 |
| 2001/0035376 A1 | | 11/2001 | Dworatzek | |
| 2015/0238885 A1 | * | 8/2015 | Bilski | ................ B01D 35/1573 210/741 |
| 2016/0220931 A1 | | 8/2016 | Ardes | |

* cited by examiner

FLUID FILTER WITH A VALVE UNIT

CROSS-REFERENCES TO RELATED APPLICATIONS

This application claims the benefit of the German patent application No. 10 2015 114 323.2 filed on Aug. 28, 2015, the entire disclosures of which are incorporated herein by way of reference.

BACKGROUND OF THE INVENTION

The present invention relates to a fluid filter having a housing, having a fluid inlet and a fluid outlet, having a central standpipe forming the fluid outlet, having a filter insert placed onto the standpipe, and having a valve unit situated on the outer periphery of the standpipe, the valve unit having a valve seat, a valve body that is movable in the axial direction of the standpipe, a valve spring that is guided on the standpipe and that pre-loads the valve body in the valve closing direction, and a valve spring support attached on the standpipe.

A fluid filter of the type described above is known from WO 2015/036 107 A1. Based on this known existing art, for the present invention the object arises of improving the functionality of the valve unit that forms a part of the fluid filter.

SUMMARY OF THE INVENTION

According to the present invention, this object is achieved by a fluid filter of the type described above that is characterized in that the valve body is formed by an elastomer body, and that a valve intermediate ring that can be axially displaced on the standpipe is situated between the valve spring and the valve body.

The present invention advantageously provides, for the fluid filter, a valve unit that, on the one hand, has a very good tightness in the closed state and, on the other hand, is operationally reliable and has low susceptibility to wear over the long term.

The elastomer body forming the valve body preferably has a flat circular annular disc shape, resulting in an advantageously small constructive height.

In a further embodiment, it is preferably provided that the valve seat is realized with valve openings running through this seat, and that the filter insert is formed by a filter material body having an upper end disc and a lower end disc that enclose the filter material body at its end faces, and that the lower end disc has a central opening, and that a peripheral pressure-exerting contour is integrally formed on the underside of the lower end disc, by which contour the filter insert, in its state installed in the fluid filter, pre-tensions the valve body in a region situated outside the valve openings, and that the valve intermediate ring is guided in axially displaceable fashion with its outer periphery on the inner periphery of the central opening and/or on the inner periphery of the peripheral pressure-exerting contour. In this way, on the one hand, the valve body is securely held on the valve seat and, on the other hand, a particularly functionally reliable guiding of the valve intermediate ring is ensured when this ring is displaced axially, and a tilting or clamping of the valve intermediate ring is reliably prevented.

In order to ensure a reliable interaction between the valve intermediate ring and the valve spring, it is preferably provided that the valve intermediate ring has, on its side facing the valve spring, a spring support surface matched in its shape to the end of the valve spring facing the valve intermediate ring.

In order also to ensure an interaction between the valve intermediate ring and the valve body that is reliable and at the same time protects the valve body, it is further preferably provided that the valve intermediate ring has, on its side facing the valve body, a valve body support surface matched in its shape to the side of the valve body facing the valve intermediate ring.

So that during operation of the fluid filter the valve intermediate ring cannot move out of its guide in undesired fashion, in the valve opening direction, thus losing its guidance, it is provided that the valve intermediate ring has, at the height of its valve body support surface, a radially outward-protruding collar that forms, with the underside of the lower end disc, a displacement stop for the valve intermediate ring in the valve opening direction. This contributes to a very reliable functioning of the valve.

So that, when the valve unit is open, a flowing out of fluid is ensured that is as low-resistance as possible, the present invention proposes that the valve intermediate ring has perforations in its region between its axial ends. These perforations make it possible for the fluid to flow in the radial direction through the valve intermediate ring, and thus to flow out with little flow resistance.

For the further reduction of the flow resistance for the fluid flowing out from the outflow side of the open valve unit, it is proposed that the valve intermediate ring is guided in rotationally fixed fashion on the standpipe, and that in the standpipe through-openings are situated so as to coincide with the perforations in the valve intermediate ring.

The rotationally fixed property mentioned above of the valve intermediate ring on the standpipe is preferably achieved in that the standpipe has first shaped elements on its outer periphery and the valve intermediate ring has second shaped elements on its inner periphery, and that the shaped elements, working together, form a rotation lock of the valve intermediate ring relative to the standpipe.

In a further embodiment, the shaped elements are preferably formed at both sides by configurations of ribs or webs or lugs that run axially and that protrude radially. In this embodiment, the shaped elements are easy to produce and reliable in their functioning.

As an alternative to the embodiment described above, in a different embodiment the shaped elements are formed at the one side by a configuration of ribs or webs or lugs that run axially and that protrude radially, and at the other side by a configuration of grooves or recesses that run axially and that are recessed radially.

For the purpose of easy and low-cost production of the fluid filter according to the present invention, the first shaped elements are usefully made in one piece with the standpipe and the second shaped elements are usefully made in one piece with the valve intermediate ring.

Here, preferably the standpipe and the valve intermediate ring are preferably injection-molded parts made of plastic, permitting a particularly low-cost mass production.

In order to still be able to supply at least unfiltered fluid to a device supplied with fluid that is filtered in the fluid filter even when the filter insert is clogged, according to the present invention it is further provided that the valve unit is or includes a filter bypass valve.

So that filtered fluid is supplied immediately upon startup to the device downstream from the fluid filter, it is useful to prevent the fluid filter from running empty when the associated device is not in operation. In this regard, the present invention proposes that the valve unit has, in addition to the filter bypass valve, a non-return valve.

Finally, for the fluid filter according to the present invention it is provided that the elastomer body forms the valve body both of the filter bypass valve and of the non-return valve. This achieves a high degree of integration, keeping low both the number of required individual parts and thus also the production and assembly costs.

BRIEF DESCRIPTION OF THE DRAWINGS

In the following, an exemplary embodiment of the present invention is explained on the basis of a drawing.

DETAILED DESCRIPTION OF THE PREFERRED EMBODIMENTS

Figure 1:
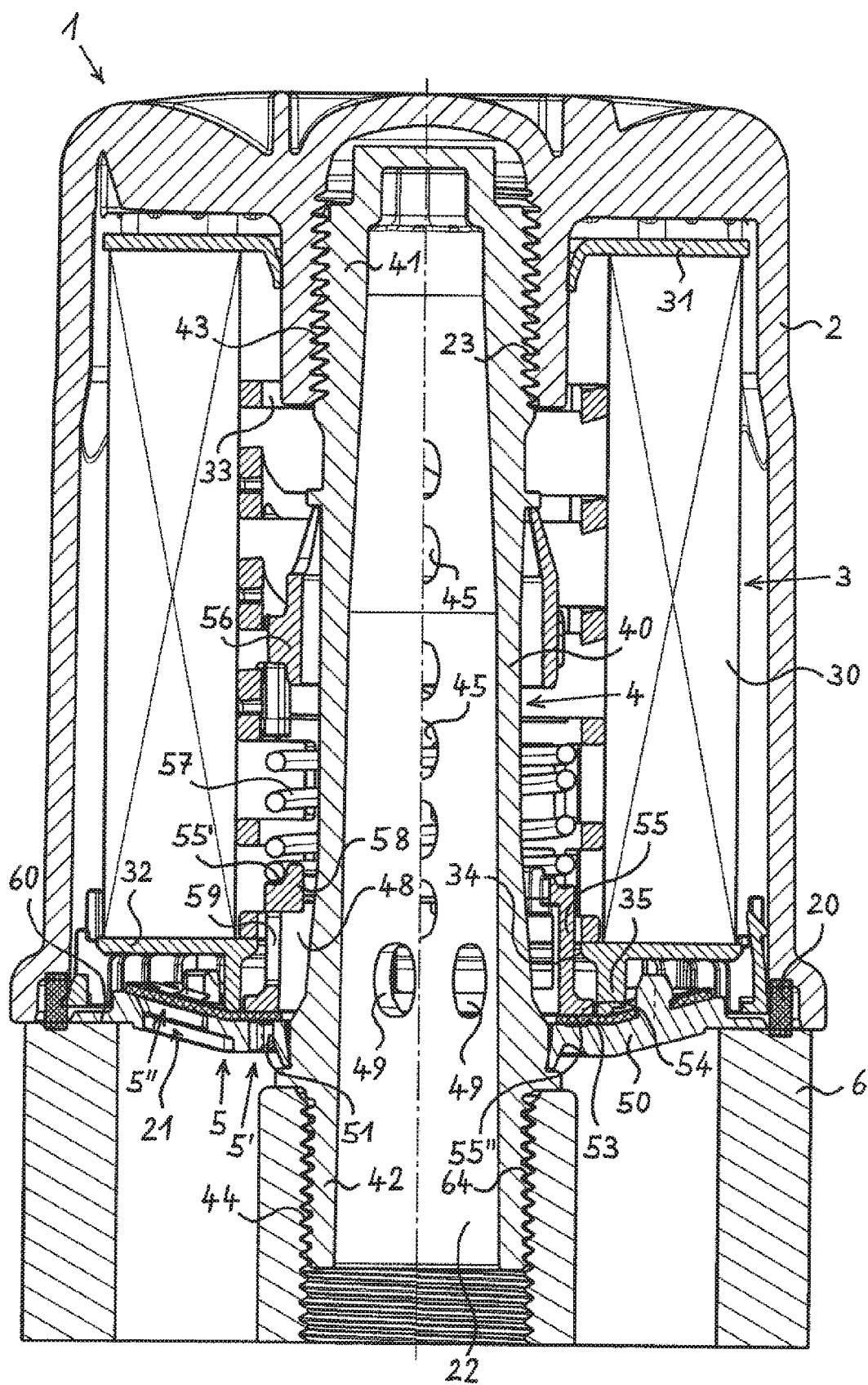
FIG. 1 shows a fluid filter in a state attached to a connecting flange, in longitudinal section.

In the following description of the Figures, identical parts in the various drawings are always provided with identical reference characters, so that all reference characters do not have to be explained again for each drawing.

FIG. 1 shows a fluid filter 1 in a state attached to a connecting flange 6, for example of an internal combustion engine, in a longitudinal section. Fluid filter 1 includes as essential parts a cup-shaped, downwardly open housing 2, a filter insert 3 situated exchangeably therein and having a hollow cylindrical shape, a central standpipe 4, and a valve unit 5 situated in the lower region of housing 2.

Housing 2 has, centrally in its upper part, a threading 23 that is screwed to a threading 43 situated on upper end region 41 of standpipe 4. On its lower end face, housing 2 has a peripheral seal 20 that, in the state shown in FIG. 1 in which housing 2 is attached to connecting flange 6, seals housing 2 against a peripheral sealing surface 60 of connecting flange 6. In its lower end region 42, standpipe 4 has a threading 44 that is screwed into a threaded connector 64 centrally in connecting flange 6.

In its region 40 situated between end regions 41, 42, standpipe 4 has a plurality of through-openings 45, 49 that are used to conduct fluid from fluid filter 1 into fluid outlet 22 in the interior of standpipe 4.

Filter insert 3 is made up of a hollow cylindrical filter material body 30 enclosed at its end faces by an upper end disc 31 and a lower end disc 32. Inside filter material body 30 there is situated a hollow cylindrical support mesh 33 that protects filter material body 30 against collapse during operation of fluid filter 1. In the state ready for operation of fluid filter 1, filter insert 3 is placed onto central standpipe 4.

Valve unit 5 has valve seat 50, whose basic shape is that of a circular annular disc, which seat sits in sealing fashion on standpipe 4 and is supported radially outwardly on sealing surface 60 of connecting flange 6. Through valve seat 50 there run valve openings 51, which, together with a valve body 53 realized as an elastomer disc, a valve intermediate ring 55 guided in axially displaceable fashion on standpipe 4, a valve spring 57 that pre-loads valve intermediate ring 55 in the closing direction, and a valve spring support 56 situated in axially fixed fashion on standpipe 4, form a filter bypass valve 5'.

Valve intermediate ring 55 situated between valve spring 57 and valve body 53 has, on its side facing the lower end of valve spring 57, a shape-matched spring support surface 55', and, on its side facing valve body 53, has a shape-matched valve body support surface 55". Support surfaces 55' and 55" provide a reliable interaction of the involved elements of filter bypass valve 5', it being ensured, in particular, that valve body 53, which is made of an elastomer, does not enter immediately into contact with valve spring 57, which is made of steel. Here, on the one hand, a good tightness of filter bypass valve 5' is brought about in its closed position, and, on the other hand, a non-damaging loading of valve body 53 with the force of valve spring 57 acting in the valve closing direction is brought about, the load being uniform over the periphery.

In its state installed in fluid filter 1, filter insert 3 pretensions valve body 53 in a region situated outside valve openings 51, by means of a peripheral pressure-exerting contour 35 integrally formed on the underside of lower end disc 32 of the filter insert.

A radially outer part of valve unit 5 forms a non-return valve 5", through which there runs a fluid inlet 21 for supplying fluid that is to be filtered to fluid filter 1.

During normal operation of fluid filter 1, fluid that is to be filtered flows through radially outer fluid inlet 21 into fluid filter 1, flows radially from the outside to the inside through filter material body 30 of filter insert 3, and then flows through through-openings 45, 49 into central standpipe 4, whose interior forms fluid outlet 22.

When the flow of fluid through filter material body 30 is reduced due to an increased flow resistance, for example due to the accumulation of dirt particles, the pressure difference of the fluid between the raw side and clean side of fluid filter 1 opens filter bypass valve 5'. Here, valve body 53 and valve intermediate ring 55 are lifted off from valve seat 50 against the force of valve spring 57, thus releasing valve openings 51. In order to ensure a flowing out of the fluid stream bypassing filter insert 3 with a low flow resistance, perforations 59 are provided in valve intermediate ring 55 that coincide with through-openings 49 in central standpipe 4.

So that perforations 59 always remain in coincidence with through-openings 49 in standpipe 4 during operation of fluid filter 1, on the outer periphery of standpipe 4 there are situated first shaped elements 48, and on the inner periphery of the valve intermediate ring 55 there are situated second shaped elements 58, which work together in the sense of a rotation lock, but permit an axial displacement of valve intermediate ring 55 relative to standpipe 4.

Lower end disc 32 of filter insert 3 has a central opening 34 around which the peripheral annular pressure-exerting contour 35 is integrally formed on the underside of lower end disc 32. Valve intermediate ring 55 extends through opening 34, and is here guided in axially displaceable fashion with its outer periphery on the inner periphery of central opening 34, and on the inner periphery of peripheral pressure-exerting contour 35.

FIG. 1 also shows that valve intermediate ring 55 has, at the height of its valve body support surface 55", a radially outward-protruding collar 54 that, with the region of the underside of lower end disc 32 surrounding opening 34, forms a displacement stop for valve intermediate ring 55 in the valve opening direction.

Figure 2:
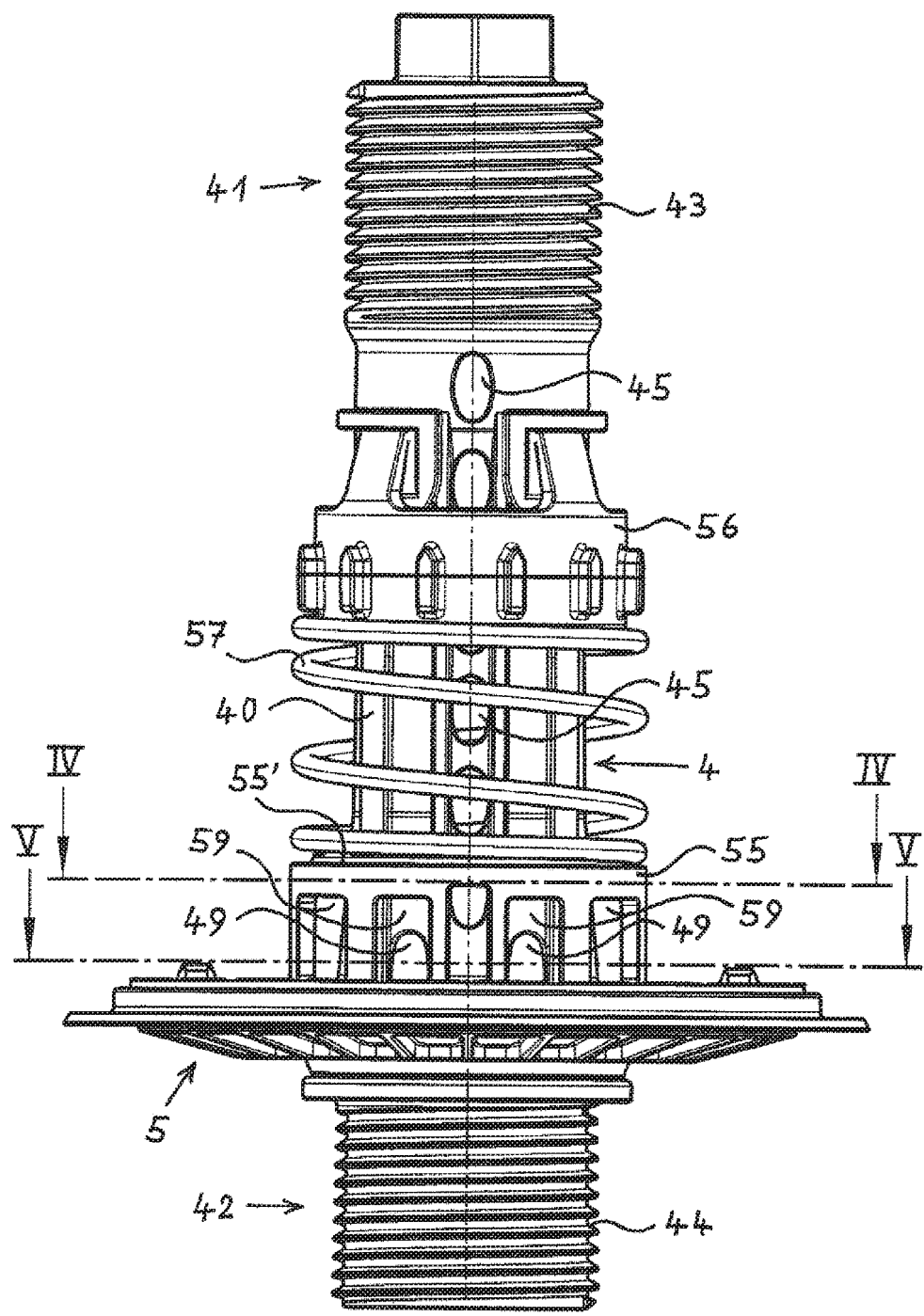
FIG. 2 shows a standpipe of the fluid filter having a valve unit, in a side view.

FIG. 2 shows standpipe 4 of fluid filter 1 with valve unit 5, in a side view. At top and at bottom in FIG. 2, the two axial end regions 41, 42 of standpipe 4, with threadings 43, 44 formed thereon, are visible. Valve unit 5 is situated on standpipe 4 over lower threading 44.

In the upper part of region 40 of standpipe 4, valve spring support 56 is fixedly situated on the outer periphery of said standpipe. Under valve spring support 56, valve spring 57 is situated on standpipe 4, which spring presses with its lower end on valve intermediate ring 55, guided in axially displaceable fashion on standpipe 4, and which spring is supported at its upper end on the underside of valve spring support 56.

Valve intermediate ring 55 has perforations 59 distributed uniformly around its periphery. As FIG. 2 shows, perforations 59 in valve intermediate ring 55 are situated so as to coincide with through-openings 49 in standpipe 4.

Figure 3:
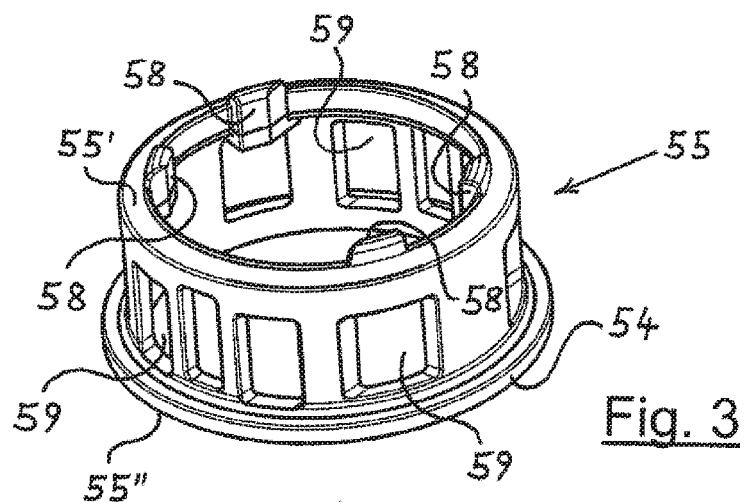
FIG. 3 shows a valve intermediate ring as part of the valve unit of FIG. 2, as an individual part, in an oblique view from above.

FIG. 3 shows valve intermediate ring 55 as a part of valve unit 5 of FIG. 2, as an individual part, in an oblique view from above. Near the upper edge of valve intermediate ring 55, on its inner periphery shaped elements 58 are visible for the rotation lock of valve intermediate ring 55 relative to the standpipe. Perforations 59 are situated in the periphery of valve intermediate ring 55. The upper end face of valve intermediate ring 55 is formed as spring support surface 55', matched in its shape to the lower spring end. The lower end face of valve intermediate ring 55 is realized as valve body support surface 55", matched in its shape to the upper side of the valve body.

In addition, valve intermediate ring 55 has a radially downward-protruding collar 54 on its lower edge, i.e., essentially at the height of its valve body support surface 55". As mentioned in connection with FIG. 1, together with the region of the underside of the lower end disc surrounding the opening in the lower end disc of the filter insert, collar 54 forms a displacement stop for valve intermediate ring 55 in the valve opening direction.

Figure 4:
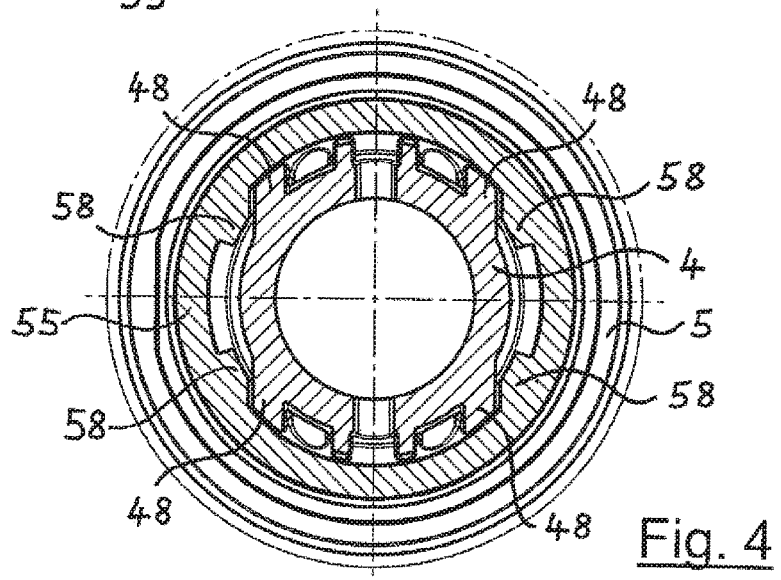
FIG. 4 shows the standpipe and the valve unit in a cross-section along the sectional line IV-IV in FIG. 2.

FIG. 4 shows standpipe 4 and valve unit 5 in a cross-section along sectional line IV-IV in FIG. 2. In the center of FIG. 4, standpipe 4 is visible, from whose outer periphery a total of (here) four shaped elements 48 protrude outward. Radially outwardly from standpipe 4, axially displaceable valve intermediate ring 55 is situated on said standpipe, and four second shaped elements 58 protrude inward from the inner periphery of said intermediate ring. Together, shaped elements 48, 58 form a rotation lock for valve intermediate ring 55 on standpipe 4.

Figure 5:
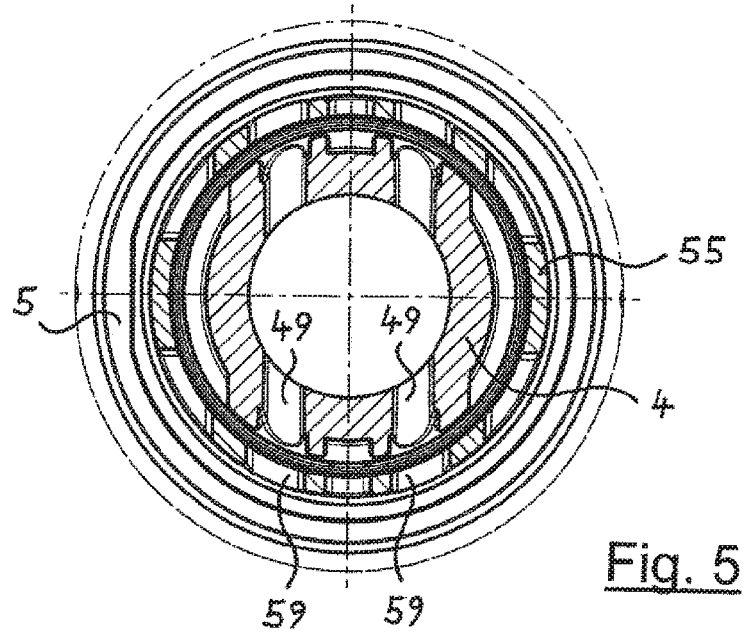
FIG. 5 shows the standpipe and the valve unit in a cross-section along the sectional line V-V in FIG. 2.

Finally, FIG. 5 shows standpipe 4 and valve unit 5 in a cross-section along sectional line V-V in FIG. 2. In the center of FIG. 5, standpipe 4 is again visible, and valve intermediate ring 55 is situated radially outward therefrom. Here, through-openings 49 in standpipe 4 and perforations 59 in valve intermediate ring 55 coincide with each other, and ensure a low flow resistance for fluid flowing through when the filter bypass valve is open.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS 1 fluid filter
2 housing
20 seal
21 fluid inlet
22 fluid outlet
23 threading in 2
3 filter insert
30 filter material body
31 end disc (top)
32 end disc (bottom)
33 support mesh in 30
34 central opening in 32
35 pressure-exerting contour on 32
4 central standpipe
40 region between 41 and 42
41 first axial end region of 4 (top)
42 second axial end region of 4 (bottom)
43 screw threading on 41
44 screw threading on 42
45 through-opening(s)
48 first shaped elements on 4 (for rotation lock)
49 through-openings in 4 at 5
5 valve unit
5' filter bypass valve
5" non-return valve
50 valve seat
51 valve openings of 5' in 50
53 valve body (elastomer body)
54 collar on 55
55 valve intermediate ring
55' spring support surface on 55
55" valve body support surface on 55
56 valve spring support
57 valve spring
58 second shaped elements on 55 (for rotation lock)
59 perforations in 55
6 connecting flange
60 sealing surface
64 threaded connection

The invention claimed is:

1. A fluid filter comprising:
a housing,
a fluid inlet and a fluid outlet,
a central standpipe forming the fluid outlet,
a filter insert placed onto the standpipe, and
a valve unit situated on the outer periphery of the standpipe, the valve unit having a valve seat, a valve body that is movable in an axial direction of the standpipe, a valve spring that is guided on the standpipe and that pre-loads the valve body in a valve closing direction, and a valve spring support attached on the standpipe,
wherein the valve body is formed by an elastomer body,
wherein between the valve spring and the valve body there is situated a valve intermediate ring that is guided in axially displaceable fashion on the standpipe, and
wherein the valve intermediate ring has perforations in its region between its axial ends.

2. The fluid filter as recited in claim 1,
wherein the valve seat comprises valve openings running through said valve seat,
wherein the filter insert is formed by a filter material body having an upper end disc and a lower end disc that enclose the filter material body at its end faces,
wherein the lower end disc has a central opening,
wherein a peripheral pressure-exerting contour is integrally formed on the underside of the lower end disc, by which contour the filter insert, in its state installed in the fluid filter, pre-tensions the valve body in a region situated outside the valve openings, and wherein the valve intermediate ring is guided in axially displaceable fashion with its outer periphery on at least one of the inner periphery of the central opening or on the inner periphery of the peripheral pressure-exerting contour.

3. The fluid filter as recited in claim 2, wherein the valve intermediate ring has, on its side facing the valve body, a valve body support surface matched in its shape to the side of the valve body facing the valve intermediate ring, and, at the height of its valve body support surface, a radially outward-protruding collar that, with the underside of the lower end disc, forms a displacement stop for the valve intermediate ring in a valve opening direction.

4. The fluid filter as recited in claim 1, wherein the valve intermediate ring has, on its side facing the valve spring, a spring support surface matched in its shape to the end of the valve spring facing the valve intermediate ring.

5. The fluid filter as recited in claim 1, wherein the valve intermediate ring has, on its side facing the valve body, a valve body support surface matched in its shape to the side of the valve body facing the valve intermediate ring.

6. The fluid filter as recited in claim 1, wherein the valve intermediate ring is guided in rotationally fixed fashion on the standpipe, and wherein through-openings are situated in the standpipe coincident with the perforations in the valve intermediate ring.

7. The fluid filter as recited in claim 6, wherein the standpipe has first shaped elements on its outer periphery, and the valve intermediate ring has second shaped elements on its inner periphery, and wherein the shaped elements, working together, form a rotation lock of the valve intermediate ring relative to the standpipe.

8. The fluid filter as recited in claim 7, wherein the shaped elements are formed at both sides by configurations of ribs or webs or lugs that run axially and that protrude radially.

9. The fluid filter as recited in claim 7, wherein the shaped elements are formed at one side by a configuration of ribs or webs or lugs that run axially and that protrude radially, and at the other side by a configuration of grooves or recesses that run axially and that are recessed radially.

10. The fluid filter as recited in claim 7, wherein the first shaped elements are formed in one piece with the standpipe, and the second shaped elements are formed in one piece with the valve intermediate ring.

11. The fluid filter as recited in claim 1, wherein the valve unit is or includes a filter bypass valve.

12. The fluid filter as recited in claim 11, wherein the valve unit includes, in addition to the filter bypass valve, a non-return valve.

13. The fluid filter as recited in claim 12, wherein the elastomer body forms the valve body, both of the filter bypass valve and of the non-return valve.

* * * * *